United States Patent
Cong et al.

(10) Patent No.: US 10,333,335 B2
(45) Date of Patent: Jun. 25, 2019

(54) SYSTEM AND METHOD OF ELECTRIC VEHICLE WIRELESS CHARGER OUTPUT PROTECTION USING ZERO VOLTAGE SWITCHING

(71) Applicant: LEAR CORPORATION, Southfield, MI (US)

(72) Inventors: Steven Cong, Novi, MI (US); David A. Hein, Sterling Heights, MI (US); Ryan Cleveland, Livonia, MI (US); Eric Salem, Berkley, MI (US)

(73) Assignee: Lear Corporation, Southfield, MI (US)

( * ) Notice: Subject to any disclaimer, the term of this patent is extended or adjusted under 35 U.S.C. 154(b) by 48 days.

(21) Appl. No.: 15/795,825

(22) Filed: Oct. 27, 2017

(65) Prior Publication Data

US 2019/0131816 A1    May 2, 2019

(51) Int. Cl.
*H02J 7/00* (2006.01)
*H02J 7/02* (2016.01)
*B60L 11/18* (2006.01)

(52) U.S. Cl.
CPC ............ *H02J 7/027* (2013.01); *B60L 11/182* (2013.01); *H02J 7/025* (2013.01)

(58) Field of Classification Search
CPC ...................................................... H02J 7/027

USPC ........................................................ 320/108
See application file for complete search history.

(56) References Cited

U.S. PATENT DOCUMENTS

| | | | |
|---|---|---|---|
| 9,444,247 B2 | 9/2016 | Kim et al. | |
| 2013/0221911 A1* | 8/2013 | Low .................... | H02J 5/005 320/108 |
| 2016/0089988 A1 | 3/2016 | Bartz et al. | |
| 2016/0218532 A1 | 7/2016 | Liu et al. | |
| 2016/0254659 A1* | 9/2016 | Chambon ............ | B60L 11/182 320/108 |

* cited by examiner

*Primary Examiner* — Suresh Memula
(74) *Attorney, Agent, or Firm* — Brooks Kushman P.C.

(57) ABSTRACT

A wireless charger output protection system and method is provided for protecting a battery in an electric vehicle during wireless charging. A wireless power transfer system includes a wireless charger on the electric vehicle side that receives power wirelessly from a charging base. The wireless charger output protection system and method shuts down the wireless charger output and dumps energy in a receive antenna (e.g., a vehicle pad) when a charging error is detected before the charging base can be shut down. The system and method employs a zero-voltage switching (ZVS) scheme to shut down the wireless charger output, in response to the charging error, to protect the switching devices and enhance overall reliability.

20 Claims, 4 Drawing Sheets

SYSTEM AND METHOD OF ELECTRIC VEHICLE WIRELESS CHARGER OUTPUT PROTECTION USING ZERO VOLTAGE SWITCHING

TECHNICAL FIELD

The present disclosure relates to a wireless charger output protection scheme for an electric vehicle battery using a zero voltage switching (ZVS) system and method.

BACKGROUND

Wireless power transfer systems enable power to be transferred wirelessly from a source to a load. Inductive power transfer is a non-radiative, or near-field, type of wireless power transfer. Inductive power transfer uses an oscillating current passing through a primary coil (i.e., a transmit antenna) of a source to generate an oscillating magnetic near-field that induces currents in a secondary coil (i.e., a receive antenna) of a load. The source includes a power converter having power transistor switches which switch at controllable times to convert power of the source into the oscillating current passing through the primary coil.

Inductive power transfer is performed to wirelessly charge a load, such a traction battery of an electric vehicle, using power from the source. In such wireless electric vehicle charging systems, the transmit antenna of the source is embedded in a "charging" mat and the receive antenna (and an associated rectifier) is embedded in a designated location of the vehicle. The inductive power transfer involves inductive coupling between the antennas. For inductive power transfer to be efficient, the spacing between the antennas must be relatively close within small offset tolerances.

An electric vehicle requires frequent charging of the traction battery. In wired charging connections, an electric vehicle's on-board charger is connected to electric vehicle supply equipment (EVSE), such as a charging station, using a cordset plugged into a vehicle's charging port. A wired control loop between the on-board charger and the EVSE is used to monitor the battery charger output while the cordset is plugged in to the charging port. Upon a detection of any unexpected problems, the control loop may immediately shut down the output from the charging station to protect the traction battery from damage. In wireless charging systems, the control loop is likewise wireless, relying on near-field communication protocols such as WiFi, Bluetooth, etc. to communicate with the power source. Due to its nature, wireless communication is generally slower than wired connections. In the event of a charging error, the source may be relatively slow to respond by shutting down. This delay may cause damage to expensive vehicle batteries and high-power electronics.

SUMMARY

One or more embodiments of the present disclosure is directed to a wireless charger output protection system, which may include a powerline, a rectifier, a powerline sensor, a switch, and a switch controller. The powerline may transmit AC current induced in a receive antenna. The rectifier may rectify the AC current from the powerline into a DC power for charging a vehicle battery. The powerline sensor may be configured to output a voltage signal indicative of a powerline voltage. The switch may be connected to the powerline and may control electrical connection between the receive antenna and the rectifier. The switch controller may be connected to the powerline sensor, the switch, and a monitoring circuit. Further, the switch controller may receive an error signal indicative of a charging error from the monitoring circuit and may output a switch control signal causing the switch to change state, in response to the error signal, when the voltage signal received from the powerline sensor indicates a zero-voltage crossing point.

One or more additional embodiments of the present disclosure is directed to a method for switching off a wireless charger output. The wireless charger may include a powerline for transmitting AC power, a rectifier for converting the AC power from the powerline into DC power, and a powerline sensor in sensing relation to the powerline for outputting a signal indicative of a powerline voltage. The method may comprise: receiving, at a switch controller, an error signal indicative of a charging error from a battery monitoring circuit; receiving, at the switch controller, a voltage signal indicative of the powerline voltage; and outputting, by the switch controller in response to the error signal, a switch control signal to a switch connected to the powerline causing the switch to change state and disconnect the powerline from a vehicle battery when the voltage signal indicates a zero-voltage crossing point.

One or more additional embodiments of the present disclosure is directed to an apparatus for shutting down wireless charging of a vehicle battery. The apparatus may include a switch controller, configured to: receive an error signal from a monitoring circuit, indicative of a charging error; receive a voltage signal, from a powerline sensor, indicative of a powerline voltage of a powerline; and output a switch control signal, in response to the error signal, to a switch causing the switch to change state and disconnect the powerline from a vehicle battery when the voltage signal indicates a zero-voltage crossing point.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
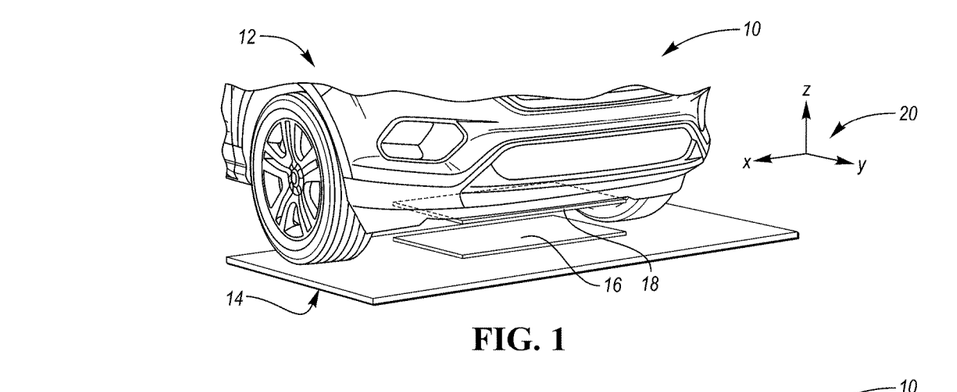
FIG. 1 illustrates a schematic diagram of an inductive power transfer system for wirelessly charging an electric vehicle with power from a charging base.

Referring now to FIG. 1, a schematic diagram of an inductive power transfer system 10 for wirelessly charging an electric vehicle 12 with power from a charging base 14 is shown. The charging base 14 includes a transmit antenna 16 positioned in the ground or on the floor of a structure. The transmit antenna is sometimes referred to a base pad or mat due to its physical configuration. The vehicle 12 includes a receive antenna 18, often referred to as a vehicle pad, mounted to the underside of the vehicle. The transmit antenna 16 and the receive antenna 18 are aligned in close arrangement when the vehicle 12 is properly parked. Power of the charging base 14 can thus be transferred from the transmit antenna 16 to the receive antenna 18 for charging the vehicle 12. The receive antenna 18 is connected to the traction battery or the like of the vehicle 12. The power wirelessly transferred from the charging base 14 to the vehicle 12 is used to charge the traction battery.

A coordinate system 20 is also shown in FIG. 1. In the coordinate system 20, the transmit antenna 16 and the receive antenna 18 are separated along the z-direction when the vehicle 12 is parked over the transmit antenna 16. The vehicle 12 (particularly the receive antenna 18) can be displaced relative to the transmit antenna 16 along either the x-direction and the y-direction (i.e., relative to the ground or floor in which the transmit antenna 16 is positioned). Displacement of the receive antenna 18 from a preset optimal aligned position relative to the transmit antenna 16 in any of the coordinate directions decreases the efficiency with which power can be wirelessly transferred from the transmit antenna to the receive antenna. In this regard, displacement of the receive antenna 18 relative to the transmit antenna 16 changes the impedance seen by the power generating component of the charging base 14 that feeds the transmit antenna 16 with power.

Figure 2:
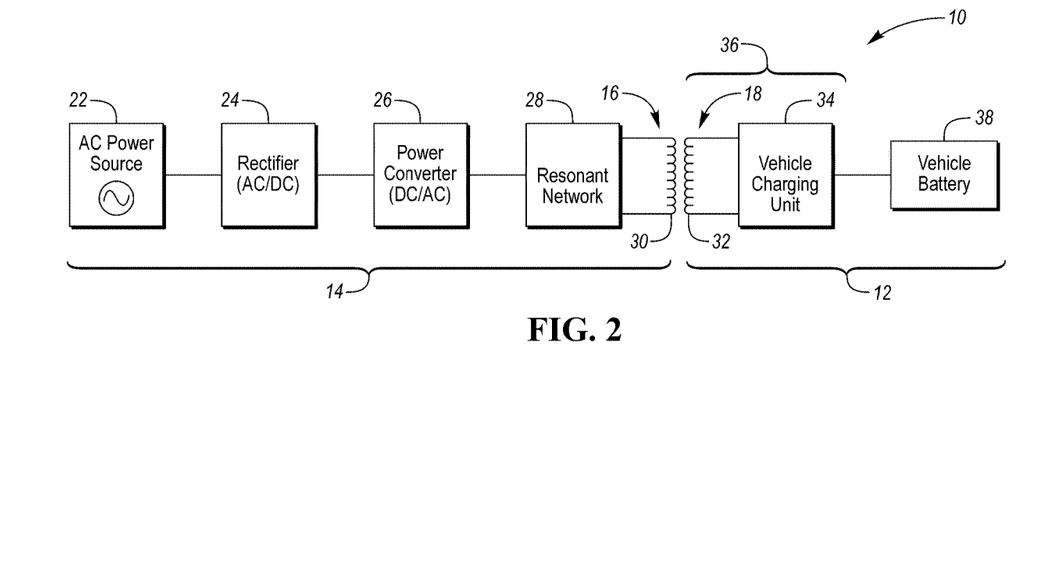
FIG. 2 illustrates a block diagram of an inductive power transfer system.

Referring now to FIG. 2, with continual reference to FIG. 1, a block diagram of the inductive power transfer system 10 is shown. As shown in FIG. 2, in addition to the transmit antenna 16, the charging base 14 of the inductive power transfer system 10 includes an AC (alternating current) power source 22, an AC/DC (alternating current/direct current) rectifier 24, a DC/AC power converter 26, and a resonant network 28. The power source 22 provides AC power to the rectifier 24. The rectifier 24 rectifies the AC power to DC power and provides the DC power to the power converter 26. The power converter 26 converts the DC power into AC power and provides the AC power to the resonant network 28.

The transmit antenna 16 includes one or more coils (i.e., primary coil 30). The receive antenna 18 of the vehicle 12 includes one or more coils (i.e., secondary coil 32). The primary coil 30 and the secondary coil 32 are physically arranged next to one another (i.e., "loosely coupled") when the vehicle 12 is properly parked. That is, the secondary coil 32 wirelessly couples with the primary coil 30 when the secondary coil is in the coupling-mode region of the primary coil providing a mutual inductance M and resonating at substantially the same frequency as the primary coil. The AC power from power converter 26 passes through the resonant network 28 and through the primary coil 30 and causes the primary coil to generate an oscillating magnetic near-field. The oscillating magnetic near-field induces currents in the secondary coil 32. The currents in the secondary coil 32 generate AC power on the vehicle side. As such, an inductive coupling between the primary coil 30 and the secondary coil 32 occurs for inductive power transfer from the charging base 14 to the vehicle 12.

As further shown in FIG. 2, in addition to the receive antenna 18, the vehicle 12 may include a vehicle charging unit 34. Together, the receive antenna 18 and the vehicle charging unit 34 may be referred to as a wireless charger 36. The vehicle charging unit 34 delivers power to a load of the vehicle 12 such as a vehicle battery 38 (i.e., traction battery).

Figure 3:
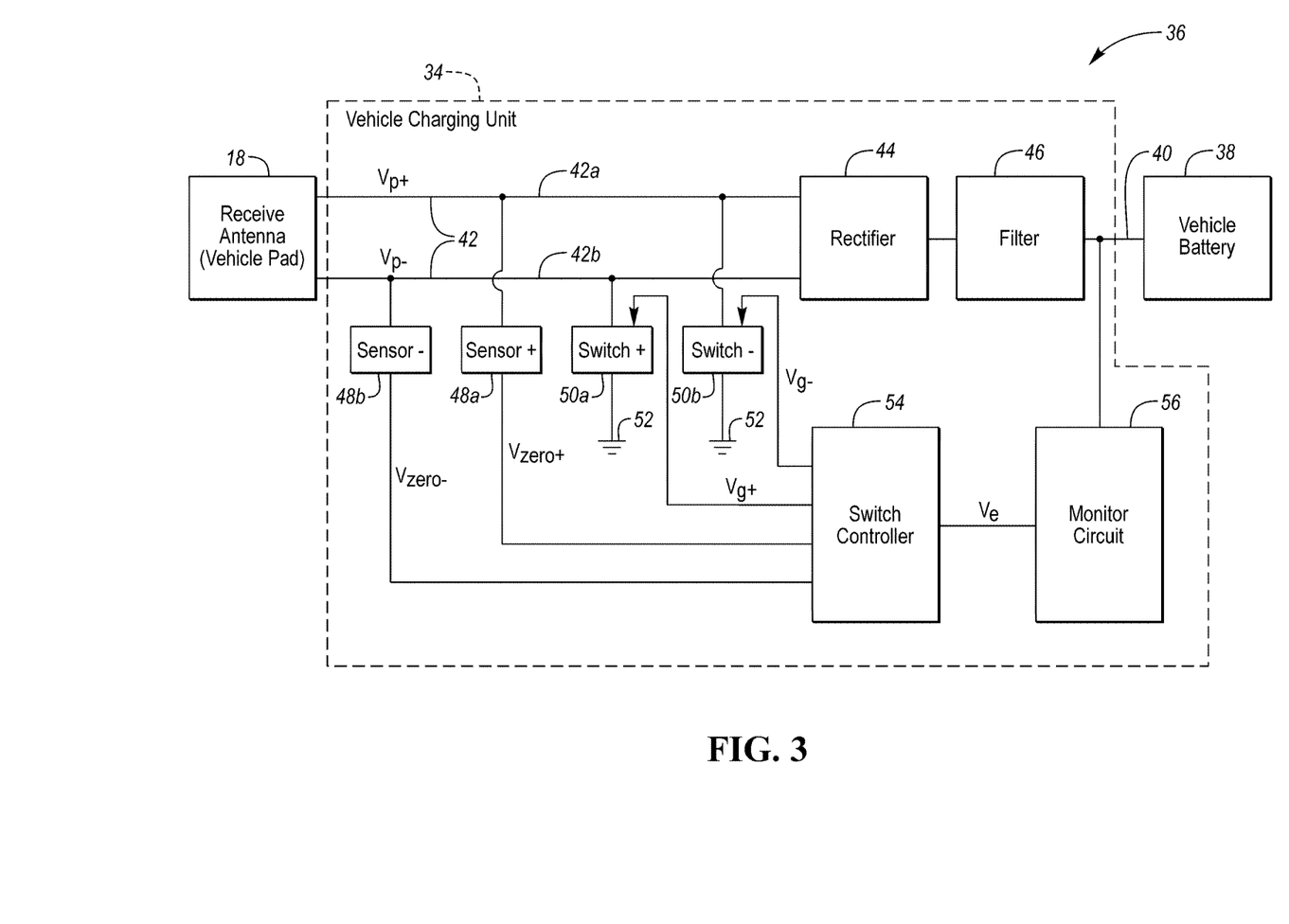
FIG. 3 illustrates a block diagram of wireless charger at the vehicle side having a ZVS controller according to one embodiment of the present disclosure.

FIG. 3 is a block diagram of the vehicle side of the inductive power transfer system illustrated in FIG. 2 illustrating the vehicle charging unit 34 in greater detail. As shown, the vehicle charging unit 34 may be connected to the vehicle battery 38 at a wireless charger output 40. As previously described, the currents induced in the secondary coil 32 of the receive antenna 18 generate AC power on the vehicle side. The AC power is delivered to the vehicle charging unit 34 along a powerline 42. The vehicle charging unit 34 may include a rectifier 44 that rectifies the AC power into DC power. The DC power from the rectifier 44 may be supplied to the vehicle battery 38 through, for example, a filter 46. This DC power at the wireless charger output 40 charges the vehicle battery 38.

Figure 4:
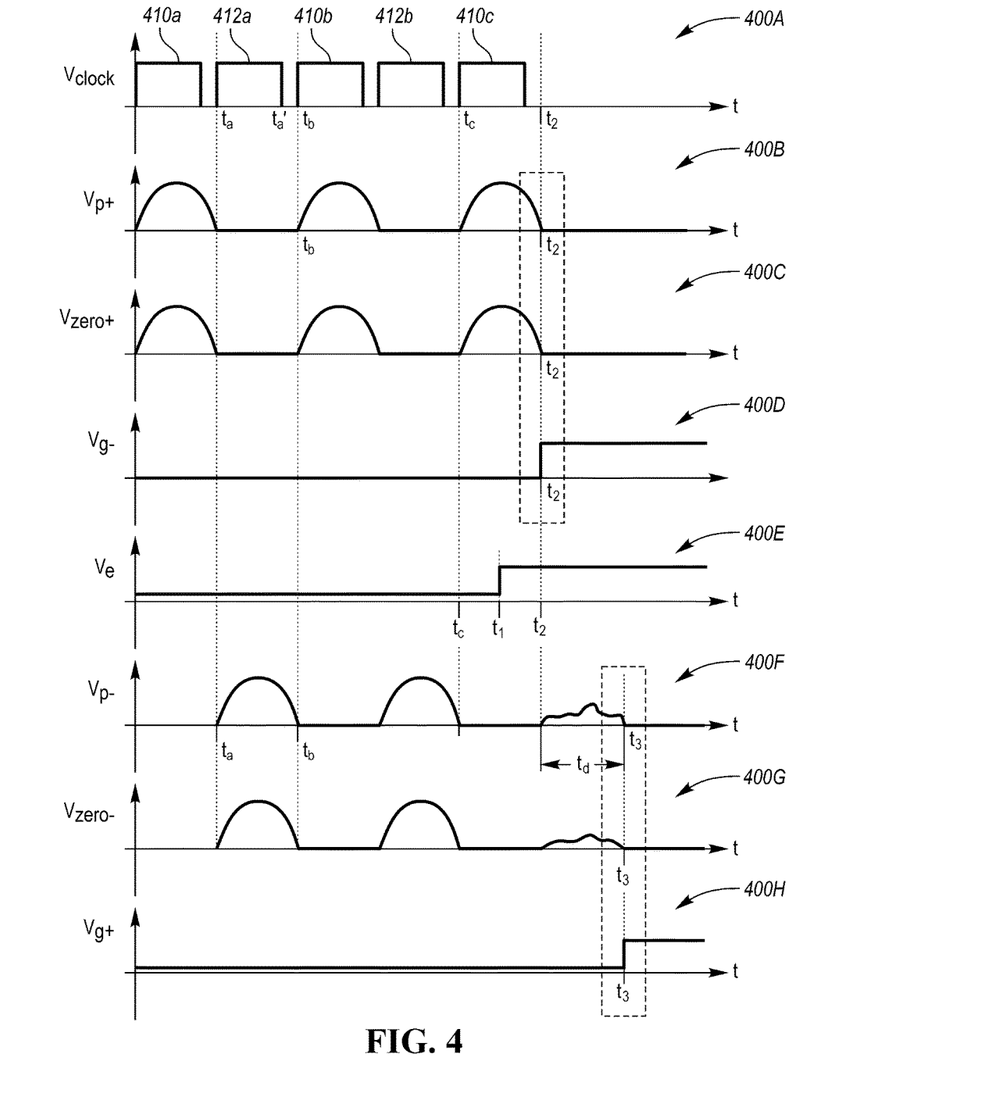
FIG. 4 illustrates plots of various voltage waveforms at the vehicle side of the charging system.

The powerline 42 may include a positive powerline conductor 42a for receiving the positive output from the receive antenna 18 and a negative powerline conductor 42b for receiving the negative output from the receive antenna. Together, positive powerline conductor 42a and the negative powerline conductor 42b deliver the AC power to the rectifier 44. Accordingly, during wireless charging, the positive powerline conductor 42a may receive a positive powerline conductor voltage $V_{p+}$ and the negative powerline conductor 42a may receive a negative powerline conductor voltage $V_{p-}$. The positive powerline conductor voltage $V_{p+}$ and the negative powerline conductor voltage $V_{p-}$ are half sine waves that are 180 degrees out of phase (FIG. 4).

The vehicle charging unit 34 may further include powerline sensors 48 in sensing relation (e.g., connected) to the powerline 42 for detecting a powerline voltage. For example, a positive powerline sensor 48a may be in sensing relation to the positive powerline conductor 42a and a negative powerline sensor 48b may be in sensing relation to the negative powerline conductor 42b. The positive powerline sensor 48a may detect the positive powerline conductor voltage $V_{p+}$ and the negative powerline sensor 48b may detect the negative powerline conductor voltage $V_{p-}$. The powerline sensors 48 may be further configured to output voltage signals indicative of the powerline voltage. For instance, the positive powerline sensor 48a may output a positive voltage signal $V_{zero+}$ indicative of the positive powerline conductor voltage $V_{p+}$ and the negative powerline sensor 42b may output a negative voltage signal $V_{zero-}$ indicative of the negative powerline conductor voltage $V_{p-}$.

The vehicle charging unit 34 may also include a switch 50 connected to the powerline 42 configured to control electrical connection between the receive antenna 18 and the rectifier 44. With continuing reference to FIG. 3, the switch 50 may include a pair of switches, such as a positive switch 50a and a negative switch 50b. As shown, the positive switch 50a may provide an ON/OFF connection between the negative powerline conductor 42b and ground 52. Similarly, the negative switch 50b may provide and ON/OFF connection between the positive powerline conductor 42a and ground 52. During normal charging operation, the switches 50a and 50b may be open and the positive powerline conductor 42a and negative powerline conductor 42b connect the receive antenna 18 to the rectifier 44. The wireless charger output 40 to the vehicle battery 38 can be shut down by closing switches 50a and 50b and providing a direct path to ground for the electrical energy in the powerline 42, effectively disconnecting the rectifier 44 from the receive antenna 18. According to an embodiment, each switch 50 may be an IGBT (insulated gate bipolar transistor), though other types of switches may be employed such as a MOSFET (metal oxide semiconductor field effect transistor). The positive switch 50a and the negative switch 50b may be controlled by a switch controller 54. The switch controller 54 may be part of main controller of the vehicle charging unit 34 or may be a dedicated controller/control circuitry for controlling the state (i.e., open/close) of the switches 50 in response to inputs received at the switch controller 54.

As previously described, the control loop used to monitor the battery charger output in wired charging connections is relatively fast. Thus, if any unexpected problems occur during wired charging, the control loop may immediately shut down the output from the charging station to protect the battery from damage. In wireless charging systems, the control loop is likewise wireless, relying on relatively slower near-field communication protocols such as WiFi, Bluetooth, etc. to communicate with the AC power source 22 (FIG. 2). In the event of a charging error, the charging base 14 may be relatively slow to respond by shutting down the power source 22. This delay may cause damage to expensive vehicle batteries and high-power electronics. The switch controller 54 may allow the wireless charger output 40 to be shut down relatively quickly, by closing switches 50, before the wireless charging control loop can communicate a shutdown message to the charging base 14.

The switch controller 54 may be in communication with a monitoring circuit 56, such as a battery monitoring circuit, for monitoring the wireless charger output 40, the vehicle battery 38 itself, or the like for unexpected problems during normal wireless charging. Accordingly, the monitoring circuit 56 may be connected between the filter 46 and the vehicle battery 38 to monitor the wireless charger output 40. Alternatively, the monitoring circuit 56 may be connected to other parts of the charging circuit, such as the powerline, to monitor the charging of the battery 38. Additionally, the monitoring circuit 56 may be in communication with the in-vehicle network (e.g., CAN) to receive messages indicative of a charging error or other problem warranting the shutdown of the wireless charger output 40. As shown, the monitoring circuit 56 may be embedded in the vehicle charging unit 34. However, the monitoring circuit 56 may be an external module in communication with the switch controller 54. If a charging error is detected by the monitoring circuit 56, the monitoring circuit 56 may send an error signal $V_e$ indicative of the charging error to the switch controller 54. As examples, the charging error may indicate one or more of the following conditions: over voltage, over current, microprocessor watchdog error, over temperature, in-vehicle network communication error, base unit error, and wireless communication error.

Responsive to the error signal $V_e$ from the monitoring circuit 56, the switch controller 54 may output a switch control signal causing the switches 50 to change state (e.g., from opened to closed). As previously described, this quickly and effectively shuts down the wireless charger output 40 to protect the vehicle battery 38 from damage due to the error conditions without having to wait for the wireless control loop to complete its path to the charging base 14. To this end, the switch controller 54 may output a positive switch control signal $V_{g+}$ to the positive switch 50a causing it to change state (i.e., close) in response to the error signal $V_e$. Similarly, the switch controller 54 may output a negative switch control signal $V_{g-}$ to the negative switch 50b causing it to change state (i.e., close) in response to the error signal. In the case of IGBT switches, the respective switch control signals may be received at the gate, providing a path to ground between the collector and emitter.

Although the switches 50 may be controlled to turn on/off at any time, turning on (i.e., closing) the switches while the respective powerline conductors are still at high voltage may result in a high voltage (e.g., up to approximately 850 volts peak) between the collector and the emitter (for an IGBT switch). In turn, this may result in a very high dI/dt transient current, which can be damaging to the switches, greatly reducing their lifespan. To improve switch reliability, and hence reliability of the wireless charger output protection system, a zero-voltage switching (ZVS) control scheme may be employed to shut down the wireless charger output 40. Under the ZVS control scheme, the switches 50 may only be turned ON (i.e., closed) when the powerline conductor voltages reach zero voltage, referred to as a zero-voltage crossing point. ZVS may increase switch reliability while allowing energy from the receive antenna 18 to be dumped to protect the vehicle battery 38.

Accordingly, the switch controller 54 may be configured to control the zero-voltage switching on the powerline conductors 42. To implement ZVS control, the switch controller 54 may be connected to both positive powerline sensor 48a and negative powerline sensor 48b. According to an embodiment, in response to the error signal $V_e$, the switch controller 54 may output the negative switch control signal $V_{g-}$ to the negative switch 50b causing it to change state (i.e., close) when the positive voltage signal $V_{zero+}$ indicative of the positive powerline conductor voltage $V_{p+}$ from positive powerline sensor 48a indicates a zero-voltage crossing point. Likewise, in further response to the error signal $V_e$, the switch controller 54 may output the positive switch control signal $V_{g+}$ to the positive switch 50a causing it to change state (i.e., close) when the negative voltage signal $V_{zero-}$ indicative of the negative powerline conductor voltage $V_{p-}$ from negative powerline sensor 48b indicates a zero-voltage crossing point.

FIG. 4 illustrates a series of timing diagrams plotting various voltage waveforms at the vehicle side of the wireless charging system. Plots 400B and 400C illustrate the waveforms of the positive powerline voltage $V_{p+}$ and the positive sensor voltage $V_{zero+}$, respectively. The positive sensor voltage $V_{zero+}$ may be substantially in phase with the positive powerline voltage $V_{p+}$ because the positive powerline sensor 48a has a mostly resistive component. Compared to the positive powerline voltage $V_{p+}$, the positive sensor voltage $V_{zero+}$ may have a much smaller amplitude (e.g. at around 3V peak), as it is used as a control input to the switch controller 54. Plots 400F and 400G illustrate the waveforms of the negative powerline voltage $V_{p-}$ and the negative sensor voltage $V_{zero-}$, respectively. The negative sensor voltage $V_{zero-}$ may be substantially in phase with the negative powerline voltage $V_{p-}$ because the negative powerline sensor 48b has a mostly resistive component. Compared to the negative powerline voltage $V_{p-}$, the negative sensor voltage $V_{zero-}$ may have a much smaller amplitude, as it too is used as a control input to the switch controller 54. As an example, the powerline voltages $V_{p+}$ and $V_{p-}$ may be both half sine waves that are out of phase by approximately 180 degrees. Since the sensor voltages $V_{zero+}$ and $V_{zero-}$ are in phase with the powerline voltages $V_{p+}$ and $V_{p-}$, respectively, they are likewise out of phase by approximately 180 degrees.

Plot 400A illustrates the waveform of a combined clock signal $V_{clock}$ generated by the switch controller 54 using the powerline voltages. For instance, the switch control 54 may generate two individual clock signals 410 and 420 that together form the combined clock signal $V_{clock}$. In particular, waveform 410 may represent a positive clock signal generated by the switch controller from the positive powerline voltage $V_{p+}$ and waveform 412 may represent a negative clock signal generated by the switch controller from the negative powerline $V_{p-}$. As illustrated in plot 400A, being a square wave, the clock signal $V_{clock}$ loosely corresponds to the powerline voltages $V_{p+}$ and $V_{p-}$, except that the clock signal $V_{clock}$ is slightly narrower than the corresponding powerline voltages. For instance, at time $t_a$, the clock signal 412a may have a rising edge triggered by the negative powerline voltage $V_{p-}$ coming ON, as illustrated in plot 400F. The clock signal 412a may have a falling edge at time $t_a'$, shortly before the negative powerline voltage $V_{p-}$ crosses zero. At time $t_b$, the next clock signal 410b may be generated by the switch controller 54 and have a rising edge triggered by the positive powerline voltage $V_{p+}$ coming ON, as illustrated in plot 400B. In addition, the negative switch control signal $V_{g-}$ may be controlled by a rising edge of the positive clock signal 410, while the positive switch control signal $V_{g+}$ may be controlled by a rising edge of negative clock signal 412.

Plot 400E illustrates the waveform of an error signal $V_e$ received by the switch controller 54 from the monitoring circuit 56. As described in connection with FIG. 3, the error signal $V_e$ may be indicative of a charging error. As an example, the error signal $V_e$ may switch from low to high at time $t_1$, indicating a charging error is detected, and the wireless charger output should be shut down. In this example, $t_1$ may occur between $t_c$, when a rising edge of positive clock signal 410c is generated, and $t_2$. Responsive to the error signal $V_e$, the vehicle charging unit 34 may wirelessly send a message using near-field communication protocols via a wireless module (not shown) to the charging base 14 to stop charging. However, as discussed above, due to the nature of the wireless communication, there may be a relatively lengthy delay between when the vehicle charging unit 34 sends the wireless message and when the charging base 14 actually shuts down. To protect the battery 38 from unwanted charging during this period of delay, the vehicle charging unit 34 may effectively disconnect the powerlines between the receive antenna 18 and the rectifier 44 on the vehicle side by using powerline switches 50 to dump the powerline energy to ground. This effectively shuts down the wireless charger output 40 with relatively little delay.

As shown in FIG. 4, the positive powerline conductor 42a may be at a high voltage at $t_1$ when the error signal $V_e$ goes high indicating a charging error. As discussed above, turning on the negative powerline switch 50b at $t_1$ to redirect the power from the positive powerline conductor 42a to ground may cause damages to the negative powerline switch 50b. Therefore, as previously described, a ZVS protection scheme may be employed to activate the powerline switches 50. Accordingly, the switch controller 54 may wait until $t_2$, when the positive powerline voltage $V_{p+}$ and the corresponding positive sensor voltage $V_{zero+}$ reaches a zero-voltage crossing point, to close (turn on) the negative powerline switch 50b and provide a path to ground for the energy in the positive powerline conductor 42a. As previously explained, this effectively disconnects the positive powerline conductor 42a from the rectifier 44. Plot 400D shows the negative switch control signal $V_{g-}$ changing state (e.g., from low to high) at $t_2$, which in turn causes the negative powerline switch 50b to change state (i.e., close).

Similarly, for the negative powerline conductor 42b, the switch controller 54 may wait half a clock cycle until $t_3$ when the negative powerline voltage $V_{p-}$ and the corresponding negative sensor voltage $V_{zero-}$ reaches a zero-voltage crossing point, controlled by a delay circuit (not shown), to close (turn on) the positive powerline switch 50a and provide a path to ground for the energy in the negative powerline conductor 42b, effectively disconnecting the negative powerline conductor 42b from the rectifier 44. Because the positive powerline conductor voltage $V_{p+}$ has already been shut to ground, the negative powerline conductor voltage $V_{p-}$ may be abnormal and can no longer be used as a clock. Thus, the delay circuit may be employed to close the positive powerline switch 50a when the negative powerline voltage $V_{p-}$ and the corresponding negative sensor voltage $V_{zero-}$ reaches a zero-voltage crossing point. Since the frequency of the negative powerline voltage $V_{p-}$ is known, the delay circuit may be designed to delay $t_3$ until the negative powerline voltage $V_{p-}$ is zero.

Plot 400H shows the positive switch control signal $V_{g+}$ changing state (e.g., from low to high) at $t_3$, which in turn causes the positive powerline switch 50a to change state (i.e., close). As a result, the AC power from the receive antenna 18 may be dumped before it reaches the rectifier 44, effectively shutting down the wireless charger output 40 and protecting the vehicle battery 38. According to an embodiment, the switch control signals $V_{g-}$ and $V_{g+}$, whichever occurs first, may be clock edge triggered, and can only change state at the edge of the clock signal $V_{clock}$. As shown, $t_2$ is at the edge of the clock signal $V_{clock}$, while $t_3$ is delayed by a calculated delay time.

Figure 5:
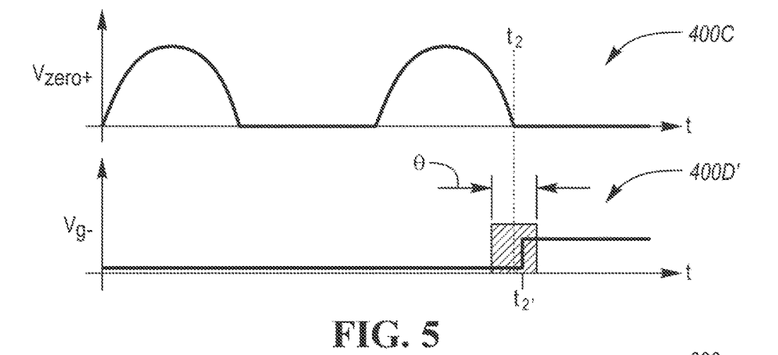
FIG. 5 illustrates a plot showing the voltage waveform having a grace period of ZVS control.

FIG. 5 illustrates an alternative timing diagram in which the switch controller 54 employs a grace period when outputting the negative switch control signal $V_{g-}$. Plot 400C in FIG. 5 is the same as Plot 400C shown in FIG. 4. Plot 400D' is a modified version of plot 400D shown in FIG. 4. Plot 400D' shows a grace period θ on either side of $t_2$. As an example, the grace period θ may be +/−5 degrees from $t_2$ when the positive powerline conductor voltage $V_{p+}$ and the positive sensor voltage $V_{zero+}$ cross at zero volts. In this embodiment, the switch controller may output the negative switch control signal $V_{g-}$ at $t_2'$. Therefore, as long as $t_2'$, at which the negative switch control signal $V_{g-}$ changes state, is within +/− the grace period θ, the circuit operation may be deemed as zero voltage switching. Though not shown, he same grace period θ may also apply to the positive switch control signal $V_{g+}$ changing state.

Figure 6:
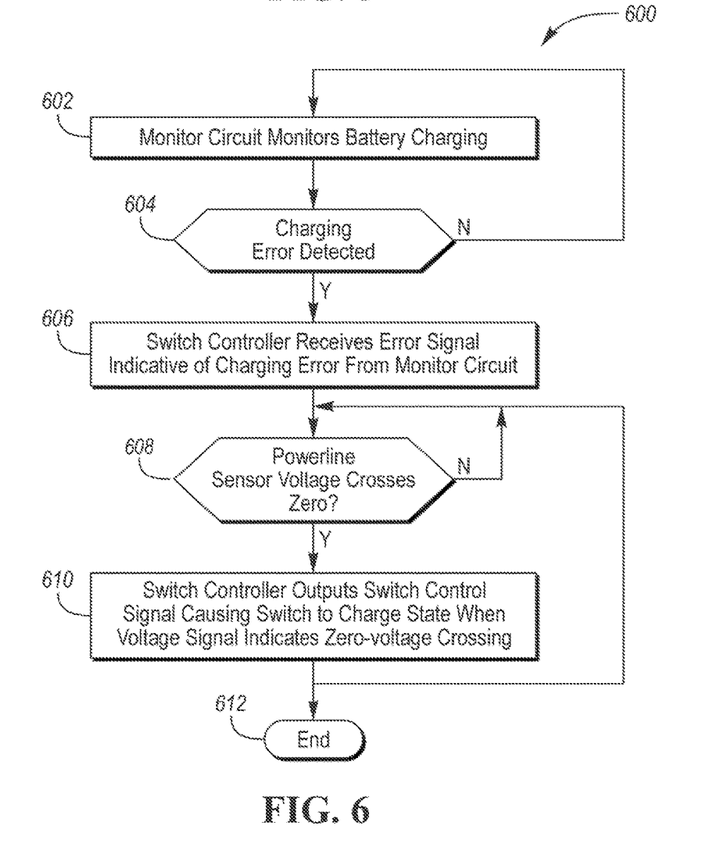
FIG. 6 illustrates a flowchart describing the operation of the method of the vehicle charging controller.

FIG. 6 is a flowchart illustrating a process 600 for switching off a wireless charger output. At operation 602, the monitoring circuit 56 monitors the charging of the vehicle battery 38. At operation 604, the monitoring circuit 56 may determine whether a charging error is detected. If no such error is detected, the process returns to operation 602 and the monitoring circuit 42 continues to monitor the charging of vehicle battery 38. If a charging error is detected, the process proceeds to operation 606. As an example, the charging error may include over voltage, over current, microprocessor watchdog error, over temperature, in-vehicle network communication error, base unit error, and/or wireless communication error.

At operation 606, the switch controller 54 may receive an error signal $V_e$ indicative of the charging error from the monitoring circuit 56. In response, at operation 608, the switch controller 54 may determine whether a powerline sensor voltage $V_{zero+}$ or $V_{zero-}$ received from the respective powerline sensors 48 indicates a zero-voltage crossing point of one of the powerline conductor voltages, $V_{p+}$ or $V_{p-}$. If not, the process may return to operation 608 and the switch controller 54 may wait until a first sensor voltage crosses zero volts. If so, the process may proceed to operation 610.

At operation 610, the switch controller 54 may output a switch control signal causing a switch connected to the powerline to change state (e.g., close) when a powerline sensor voltage, $V_{zero+}$ or $V_{zero-}$, indicates zero-voltage crossing. For example, if the output, $V_{zero+}$, of the positive powerline sensor 48a, sensing the positive powerline conductor voltage $V_{p+}$, indicates the positive powerline conductor voltage $V_{p+}$ crossing zero volts first (i.e., before the negative powerline conductor voltage $V_{p-}$), the switch controller 54 may cause the negative switch control signal $V_{g-}$ to the negative powerline switch 50b to change state. Consequently, the negative powerline switch 50b may change state (i.e., close) during the zero-voltage crossing point of the positive powerline conductor voltage $V_{p+}$ to protect the switch and provide a path to ground for dumping energy in the receive antenna 18. Then, the process may return to operations 608 and 610 to similarly close the positive powerline switch 50a when the negative powerline conductor voltage $V_{p-}$ reaches a zero-voltage crossing point.

Alternately, if the output, $V_{zero+}$, of the negative powerline sensor 48b, sensing the negative powerline conductor voltage $V_{p-}$, indicates the negative powerline conductor voltage $V_{p-}$ crossing zero volts first (i.e., before the positive powerline conductor voltage $V_{p+}$), the switch controller 54 may cause the positive switch control signal $V_{g+}$ to the positive powerline switch 50a to change state. Consequently, the positive powerline switch 50a may change state (i.e., close) during the zero-voltage crossing point to protect the switch and provide a path to ground for dumping energy in the receive antenna 18. Then, the process may return to operations 608 and 610 to similarly close the negative powerline switch 50b when the positive powerline conductor voltage $V_{p+}$ reaches a zero-voltage crossing point. After repeating operations 608 and 610, the process may end at operation 612.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A wireless charger output protection system comprising:
   a powerline configured to transmit AC current induced in a receive antenna;
   a rectifier configured to rectify the AC current from the powerline into a DC current for charging a vehicle battery;
   a powerline sensor configured to output a voltage signal indicative of a powerline voltage;
   a switch connected to the powerline configured to control electrical connection between the receive antenna and the rectifier; and
   a switch controller, connected to the powerline sensor, the switch and a monitoring circuit, configured to receive an error signal indicative of a charging error from the monitoring circuit and output a switch control signal causing the switch to change state, in response to the error signal, when the voltage signal received from the powerline sensor indicates a zero-voltage crossing point.

2. The system of claim 1, wherein the switch controller outputs the switch control signal within a grace period from the time when the voltage signal indicates a zero-voltage crossing point.

3. The system of claim 2, wherein the grace period is +/−5 degrees in phase.

4. The system of claim 1, wherein the voltage signal is substantially in phase with an AC powerline voltage that is input into the powerline sensor with a smaller voltage amplitude.

5. The system of claim 1, wherein the powerline includes a positive powerline conductor and a negative powerline conductor,
   the powerline sensor includes a positive powerline sensor in sensing relation to the positive powerline conductor configured to output a positive voltage signal indicative of a positive powerline conductor voltage and a negative powerline sensor in sensing relation to the negative powerline conductor configured to output a negative voltage signal indicative of a negative powerline conductor voltage, and
   the switch includes a positive switch and a negative switch each connected to one of the positive powerline conductor and the negative powerline conductor.

6. The system of claim 5, the positive switch is connected to the negative powerline conductor and the negative switch is connected to the positive powerline conductor,
   wherein the switch controller is configured to output a negative switch control signal to the negative switch causing the negative switch to change state upon receipt of the error signal when the positive voltage signal received from the positive powerline sensor indicates a zero-voltage crossing point and subsequently output a positive switch control signal to the positive switch causing the positive switch to change state when the negative voltage signal received from the negative powerline sensor indicates a zero-voltage crossing point.

7. The system of claim 1, wherein the charging error includes at least one of over voltage, over current, microprocessor watchdog error, over temperature, in-vehicle network communication error, base unit error, and wireless communication error.

8. The system of claim 1, wherein the switch comprises an insulated-gate bipolar transistor (IGBT) having a gate that is connected to the switch controller.

9. The system of claim 8, wherein the IGBT is without a body diode.

10. A method for switching off a wireless charger output, the wireless charger including a powerline for transmitting AC power, a rectifier for converting the AC power from the powerline into DC power, and a powerline sensor in sensing relation to the powerline for outputting a signal indicative of a powerline voltage, the method comprising:
    receiving, at a switch controller, an error signal indicative of a charging error from a battery monitoring circuit;
    receiving, at the switch controller, a voltage signal indicative of the powerline voltage; and
    outputting, by the switch controller in response to the error signal, a switch control signal to a switch connected to the powerline causing the switch to change state and disconnect the powerline from a vehicle battery when the voltage signal indicates a zero-voltage crossing point.

11. The method of claim 10, wherein the voltage signal is substantially in phase with the AC power.

12. The method of claim 11, wherein the switch changes state within a grace period from the time when the voltage signal indicates a zero-voltage crossing point.

13. The method of claim 12, wherein the grace period is +/−5 degrees in phase.

14. The method of claim 10, wherein the charging error includes at least one of over voltage, over current, microprocessor watchdog error, over temperature, in-vehicle communication error, base unit error, and wireless communication error.

15. The method of claim 10, further comprising monitoring charging of the vehicle battery by the monitoring circuit; and
sending the error signal from the monitoring circuit to the switch controller upon detection of the charging error.

16. An apparatus for shutting down wireless charging of a vehicle battery, comprising:
a switch controller, configured to
receive an error signal, from a monitoring circuit, indicative of a charging error;
receive a voltage signal, from a powerline sensor, indicative of a powerline voltage of a powerline; and
output a switch control signal, in response to the error signal, to a switch causing the switch to change state and disconnect the powerline from a vehicle battery when the voltage signal indicates a zero-voltage crossing point.

17. The apparatus of claim 16, wherein the voltage signal is substantially in phase with the powerline voltage.

18. The apparatus of claim 16, wherein the switch changes state within a grace period from the time when the voltage signal indicates a zero-voltage crossing point.

19. The apparatus of claim 18, wherein the grace period is +/−5 degrees in phase.

20. The apparatus of claim 16, wherein the charging error includes at least one of over voltage, over current, microprocessor watchdog error, over temperature, in-vehicle communication error, base unit error, and wireless communication error.

* * * * *